Feb. 20, 1968   J. B. REESE   3,369,703
DISPENSING APPARATUS WITH FLOATING CHAMBER
AND COMPRESSED GAS DISCHARGE
Filed Dec. 12, 1966   3 Sheets-Sheet 1
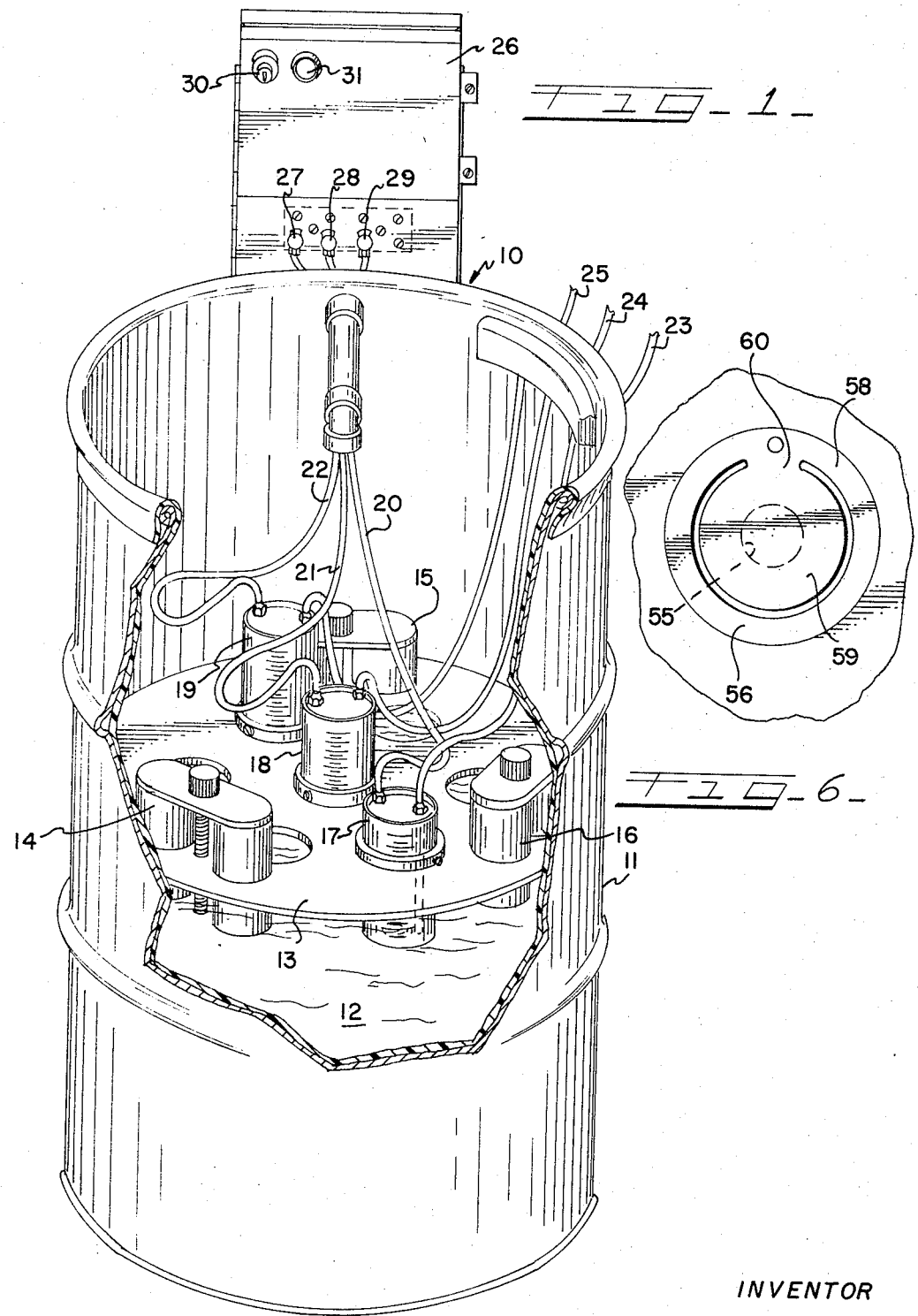
INVENTOR
JOHN B. REESE
BY
Greist, Lockwood, Greenawalt & Dewey
ATTY Feb. 20, 1968  J. B. REESE  3,369,703
DISPENSING APPARATUS WITH FLOATING CHAMBER
AND COMPRESSED GAS DISCHARGE
Filed Dec. 12, 1966  3 Sheets-Sheet 2
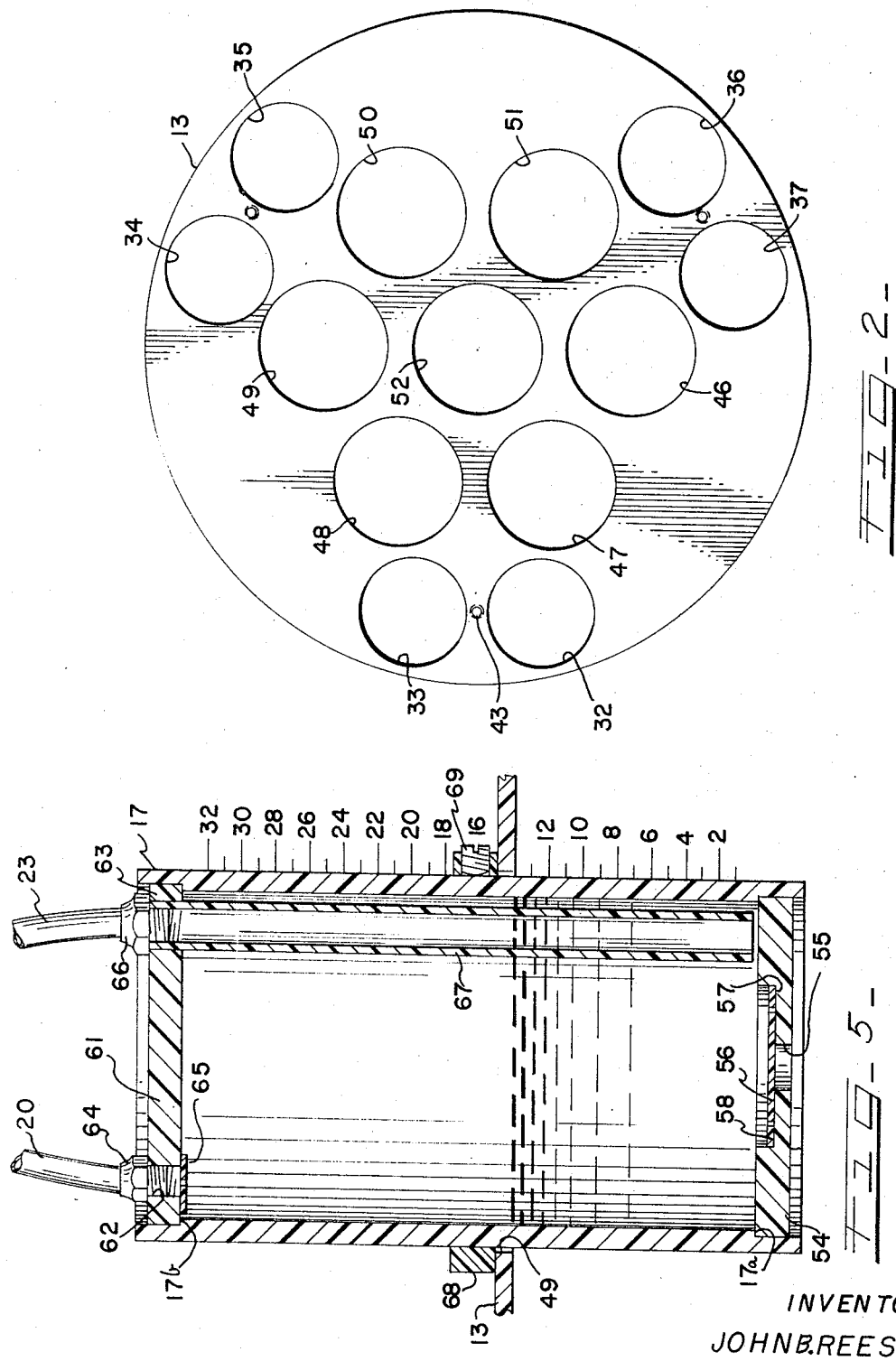
INVENTOR
JOHN B. REESE
BY
Dreist, Lockwood, Greenawalt & Dewey
ATTY

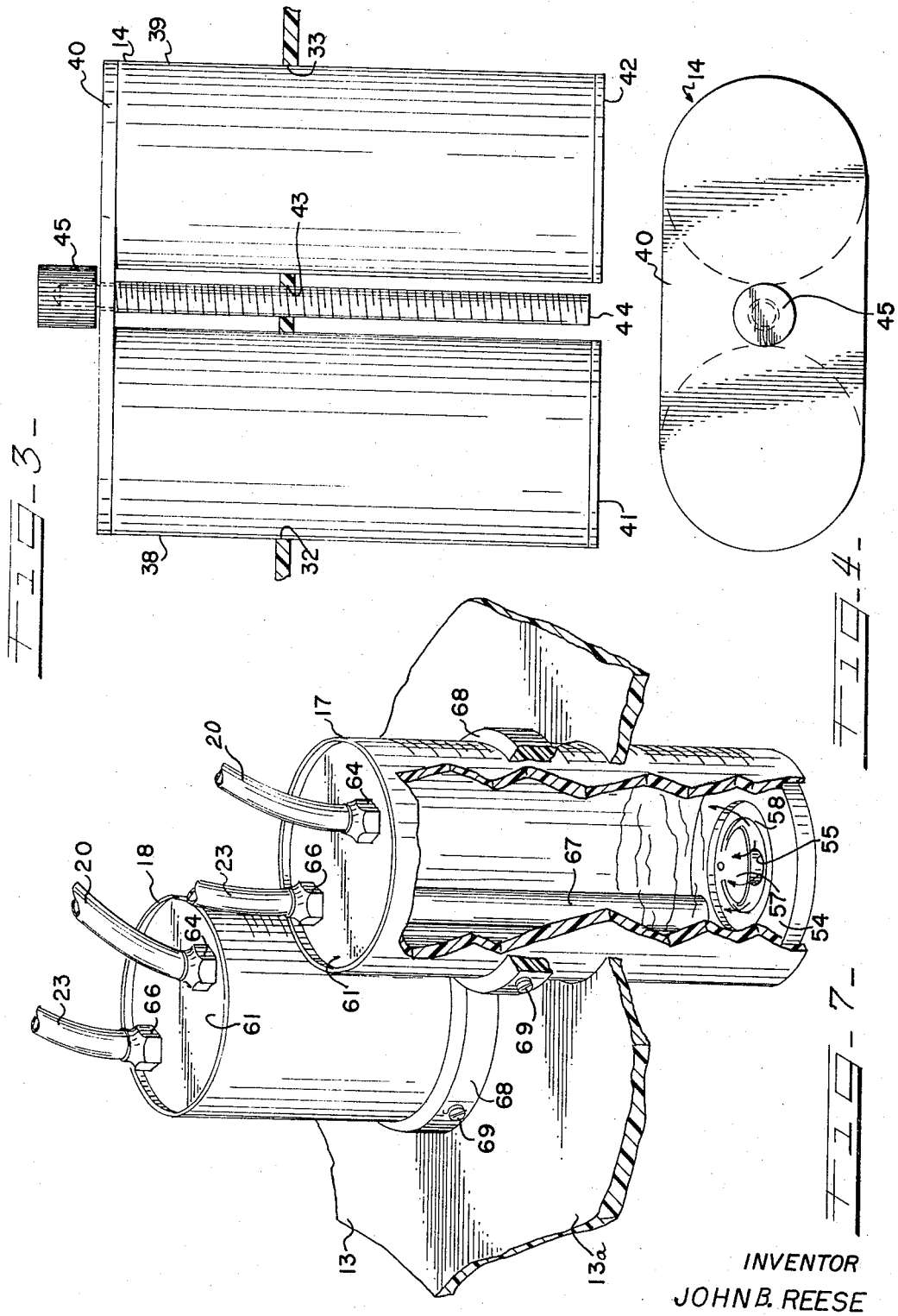

United States Patent Office 3,369,703
Patented Feb. 20, 1968

1

3,369,703
DISPENSING APPARATUS WITH FLOATING CHAMBER AND COMPRESSED GAS DISCHARGE
John B. Reese, Grafton, Wis., assignor to Wright Chemical Corporation, Chicago, Ill., a corporation of Illinois
Filed Dec. 12, 1966, Ser. No. 601,167
10 Claims. (Cl. 222—1)

The present invention is directed to improvements and innovations in apparatus and method for dispensing controlled amounts of liquids. More particularly, the invention is concerned with a novel and improved apparatus and method for dispensing selectively variable amounts of liquids, such as, for example, liquid chemicals which are contained in a supply tank.

While the present invention is generally suitable for dispensing of all liquids, a specific embodiment thereof is particularly suitable for use in water treatment operations wherein liquid biocides and/or corrosion inhibitors are distributed in predetermined amounts. A typical illustrative example of such an operation would be a brewery pasteurizer wherein a number of water-holding compartments are each maintained at a different temperature with each compartment containing different amounts of water. Beer in bottles and/or cans is subjected to washes of water at different temperatures to raise the beer temperature to approximately 140° F. for a specific period of time, after which the beer temperature is then lowered. In such installations, it is necessary to chemically treat each compartment of the pasteurizer individually for effectively controlling the growth of micro-organisms (slime) and for the control of scale and corrosion therein.

General practice has been to manually measure the correct quantity of a liquid contained in a supply drum and pour the same into the openings of each of the individual compartments. Since the water quantity varies between these compartments, it is often necessary to make several measurements to accomplish effective treatment for each compartment of the pasteurizer. This method of treatment possesses inherent disadvantages among which include the possibility of inaccurate measurement by the operator as well as the expense incurred in having such operator attend to these duties. Such disadvantages become particularly significant where the plant in question has a number of different pasteurizers, each of which has a number of separate water-holding compartments requiring separate treatment.

The present invention overcomes the above-mentioned disadvantages. In particular, in accordance with one aspect of the present invention, a novel dispensing apparatus is provided having a buoyant plate which floats on the surface of the liquid to be dispensed. One or more transfer chambers are mounted to the buoyant plate which transfer chambers are particularly equipped for filling with selectively variable amounts of liquid which are dispensed by discharging compressed air or some other gas therein. In a preferred embodiment, the transfer chambers are vertically movable with respect to the buoyant plate and each is provided with an adjustably positionable ring adapted to engage the float plate when the transfer chamber has been filled with the desired amount of liquid. Such transfer chambers can be easily removed from the float plate by merely lifting them out of the receiving socket in the plate. Accordingly, adjustment and/or cleaning of the transfer chambers is thereby facilitated and can be accomplished without subjecting the operator to contact with the noxious fumes which may be emitted by the water treating biocides and/or corrosion inhibitors contained in the supply tank.

Liquid dispensers which incorporate a transfer chamber of finite capacity are old in the art, typical examples thereof being set forth in U.S. Letters Patent Nos. 1,042,-106, 1,042,216, 2,520,398 and 2,540,290. In such prior art teachings, the transfer chamber is generally located adjacent the bottom of the supply tank and fixed thereto in such manner so as to make difficult, if not impossible, cleaning and/or adjustment of the transfer chamber. As such, these prior art teachings do not suggest the concept of a transfer chamber which can be adjusted to provide dispensing of selectively variable amounts of a liquid.

It is, therefore, an important object of the present invention to provide a new and improved liquid dispensing apparatus and method which permits the dispensing of selectively variable amounts of liquids to one or more locations.

Another object of the present invention is to provide a new and improved dispensing apparatus which includes a transfer chamber removably mounted to a buoyant plate which is adapted to float on the surface of the liquid to be dispensed which transfer chamber can be easily removed from the float plate by merely lifting the same therefrom for cleaning and/or adjustment purposes.

Another object of the present invention is to provide a new and improved dispensing apparatus which can be either manually or automatically controlled for dispensing selectively variable amounts of a liquid to one or more areas located either remote from, or adjacent to, the supply tank containing the liquid to be dispensed.

Another object of the present invention is to provide a new and improved dispensing apparatus which is particularly adapted for the dispensing of water treatment biocides and/or corrosion inhibitors to the various water-holding compartments in a pasteurizer.

Other objects and advantages of the present invention will be apparent from the following detailed description taken in conjunction with the accompanying drawings wherein:

FIGURE 1 is a fragmentary perspective, partially broken away, of a chemical storage drum equipped with one embodiment of the liquid dispensing apparatus of the present invention;

FIGURE 2 is a plan view of the float plate shown in the dispensing apparatus of FIGURE 1;

FIGURE 3 is a side elevational view of one of the float assemblies which is mounted to the float plate of FIGURE 2 as is shown in FIGURE 1;

FIGURE 4 is a plan view of the float assembly shown in FIGURE 3;

FIGURE 5 is a vertical sectional view of a transfer chamber mounted to the flow plate of FIGURE 2 (partially shown) illustrating the interior cross section of the transfer chamber;

FIGURE 6 is a plan view of the flapper valve shown in the transfer compartment of FIGURE 5; and FIGURE 7 is a fragmentary perspective of a float plate and a pair of transfer chambers of the dispensing apparatus of the present invention with the outer wall of one of said transfer chambers broken away to illustrate the interior components thereof during a filling operation.

Referring to the drawings and with particular reference to FIGURE 1, the numeral 10 generally designates an embodiment of the invention particularly suitable for use in the dispensing of liquid chemicals to a plurality of water holding compartments in a pasteurizer installation. Dispenser 10 includes a supply drum 11 containing a liquid 12 (i.e. a biocide or corrosion inhibitor) to be dispensed and is equipped with a float plate 13 which is provided with a plurality of float assemblies 14–16 and transfer chambers 17–19. As is shown, each of the transfer chambers 17–19 is equipped with an air inlet line 20–22 and a liquid discharge line 23–25, respectively.

The novel float plate transfer chamber arrangement of the present invention can be used with air control means well known to those skilled in this art. Accordingly, the present invention is not to be limited to any particular air control system. By way of example only, one such arrangement which may be used is partly illustrated in FIGURE 1 and generally includes a bracket 26 mounted to the supply drum 11. On the back surface of the mounting bracket an air inlet manifold (not illustrated) communicates directly with air inlet lines 20–22 through a suitable valve means 27–29 which serve to regulate the flow of air into the transfer chambers 17–19, respectively. The discharge of air into the transfer chambers can be automatically regulated by means of a suitable timing device, or, if desired, manual activation can be accomplished by means of a conventional key operated push button control 30 which communicates with the air inlet manifold in a conventional manner. If desired, a pilot light 31 may be used in order to provide a visual indicator that the dispensing apparatus is in operation.

Float plate 13, more fully illustrated in FIGURE 2, is equipped with a plurality of holes or receiving wells 32–37 equidistantly spaced along the outer periphery of plate 13 and particularly adapted for receiving the float assemblies 14–16 which are more fully illustrated in FIGURES 3 and 4. In particular, float assembly 14 (identical to the other float assemblies) includes a pair of tubular bodies 38 and 39 which are hermetically sealed at their upper end by a common cover member 40 and at their lower ends by bottom caps 41 and 42, respectively. The tubular body members 38 and 39 of the float assembly 14 are sized to fit within the receiving wells 32 and 33. Between receiving wells 32 and 33 is a tapped or threaded hole 43 which is sized to receive the threaded rod 44 having a knurled knob 45 for adjusting the position of the float assembly with respect to the float plate 13. In this manner, the buoyancy provided by the float assembly can be adjustably controlled so as to zero the upper surface 13a of the float plate 13 on the surface of the liquid in the supply drum 11. For example, with a right hand thread, turning the knob 45 clockwise causes the threaded rod 44 to force extension of the float cylinders 38 and 39 which adds buoyancy to the float assembly 14 and in turn causes the float plate 13 to rise with respect to the liquid surface. Correspondingly, counterclockwise rotation of the knob reduces the buoyancy so that the float plate 13 moves downward toward the liquid surface.

As noted, the float assemblies 14–16 are equidistantly spaced around the outer periphery of float plate 13 so as to provide leveling of the float plate with respect to the liquid surface and thereby avoid canting or jamming thereof in the supply drum 11. In this regard, the use of a relatively thin plate (e.g. one about ¼ inch thick) having a diameter sized slightly less than the inside diameter of the supply drum 11 with three float assemblies spaced approximately 120° apart as shown in FIGURE 2 is preferred. If desired, the use of one or more separate float assemblies can be eliminated by forming float plate 13 of a buoyant material (e.g. polyurethane foam).

As is best shown in FIGURE 2, float plate 13 includes a plurality of transfer chamber receiving wells 46–52, the number of such wells or specific arrangement thereof being optional and governed primarily by the dispensing requirements for the apparatus. It is not necessary to use each of the receiving wells in the operation of the dispenser. For example, as is shown in FIGURE 1, while the float plate 13 is equipped with seven wells, only three such wells are used, viz, wells 46, 52, and 49 are equipped with transfer chambers 17, 18 and 19, respectively.

In FIGURE 5, transfer chamber 17 (typical of the other transfer chambers) is illustrated in section. As is shown, the transfer chamber generally includes a cylindrical body 53 having an outer diameter smaller than the inner diameter of the receiving well 49 so that the transfer chamber loosely fits within the well and is freely vertically movable therein. The bottom portion of the cylindrical body 53 is fitted with a bottom cover 54 which snugly engages with bottom shoulder 17a and is equipped with receiving inlet 55. A one way valve, in this case a flapper type valve 56, permits flow into the interior of transfer chamber 17. Valve 56 overlies shoulder 57 of bottom cover 54 and can be formed of any flexible material, such as, for example, a soft vinyl plastic. As is best shown in FIGURE 6, flapper valve 56 includes an outer circumferential portion 58 which is fixed to the shoulder 57, such as, for example, by solvent welding. The central portion or flap thereof 59 is thereby permitted to lift around the axis of hinge portion 60 enabling the inflow of liquid into the interior of the transfer chamber 17 through inlet 55.

The upper end of transfer chamber 17 is similarly equipped with a top cover 61, snugly fitted against shoulder 17b, and drilled and tapped with an air inlet 62 and liquid outlet 63. Air inlet 62 having a female thread is fitted with a tubing adaptor 64 which serves to couple air inlet line 20 with the interior of transfer chamber 17. An orifice plate 65 is provided for controlling the flow of air into the interior of the transfer chamber.

Liquid discharge outlet 63 is also threaded and fitted with a tubing adaptor 66 which is connected with liquid discharge line 23. In addition, a discharge tube 67 is fitted in discharge outlet 63 and extends into the interior of transfer chamber 17 to a point just adjacent the bottom cover member 54.

The outside diameter of transfer chamber 17 is fitted with a loose fit ring 68 containing a set screw 69 for adjusting the travel of transfer chamber 17 in well 46 in float plate 13. If desired, transfer chamber 17 can be calibrated as is diagrammatically shown in FIGURE 5. In this manner, ring adjustments can be made to accurately determine the volume of liquid which will be received in the transfer chamber 17. In this regard, an important advantage of the present invention resides in the fact that filling capacity adjustments can be made externally from the dispensing apparatus by merely lifting the entire transfer chamber from the float plate 13. In other words, an operator need merely lift the transfer chamber 17 from the float plate 13 and make adjustments to loose fit ring 68 while the transfer chamber is outside of the supply drum 11 without subjecting himself to any fumes or objectionable vapors which would be present adjacent the surface of the liquid 12.

In operation, each of the transfer chambers is filled automatically. For example, as is best shown in FIGURE 7, upper surface 13a of float plate 13 is flush with the liquid level in the supply drum. Accordingly, when the transfer chamber 17 is empty, it will be urged upwardly from the float plate 13 by reason of the buoyant force thereof. The weight of the transfer chamber, however, causes flap 59 to open and thereby permit the inflow of liquid into the interior of the chamber, resulting in the transfer chamber gradually increasing in weight. This increase in weight causes the transfer chamber to move downwardly with respect to the float plate 13 until the loose fit ring 68 engages with the upper surface 13a. The transfer chamber is then ready for discharge of a predetermined amount of liquid to a remote location via liquid discharge line 23.

Discharge of the liquid is activated by energizing of an air valve which causes compressed air (or an equivalent gas) to pass to the manifold (not illustrated) and from there to the particular transfer chamber. As the air passes from air inlet line 20 through the orifice plate 65 and into the interior of the chamber 17, the flapper valve 56 is immediately closed. The liquid contents are simultaneously transmitted to the discharge tube 67 into liquid discharge tubing 23. Upon completion of evacuation of the liquid from the cylinder, the compressed air passes through the discharge tubing blowing the same free from any liquid residue. In this manner, the tubing outside the dispenser apparatus does not contain any liquid except for the very brief period during injection. As a result, the danger of leakage due to pressurized chemical lines is substantially reduced. When the air supply valve is closed, plant air is shut off and a suitable valve in the manifold vents all downstream pressure to the atmosphere. The return of the transfer chamber to atmospheric pressure causes filling of the transfer chamber 17 to its original liquid level which, as previously noted, has been regulated by the securing of loose fit ring 68 to the outside of the measuring cylinder. Changes in the liquid level in the supply durm 11 will not affect the filling operation since float plate 13 follows the liquid level as the liquid is dispensed. If desired, a secondary supply source can communicate with the supply drum for automatically filling the supply drum 11 when the liquid level therein reaches a predetermined point. Such automatic filling techniques are, of course, well known in the art and can operate on a float principle or other equivalent means.

In the foregoing specification, a detailed description of a specific embodiment of the present invention has been fully set forth. It will, however, be apparent to those killed in this art that variations and modifications may be made therefrom without departing from the spirit and scope of this invention. Accordingly, the present invention is to be limited only by the appended claims.

I claim:

1. Apparatus for dispensing controlled amounts of liquid, said apparatus comprising a supply tank containing a liquid to be dispensed, a buoyant member freely floating on the surface of said liquid, a transfer chamber mounted to said buoyant member, said transfer chamber having a liquid inlet disposed below the liquid surface in said supply tank, said inlet being equipped with valve means which permits liquid flow into said transfer chamber only, said transfer chamber being further equipped with a liquid outlet, and means for directing a compressed gas into said transfer chamber for discharging the liquid contents thereof through said liquid outlet.

2. The apparatus of claim 1 wherein said transfer chamber is freely vertically movable with respect to said buoyant member and is provided with stop means for limiting the downward travel of said transfer chamber with respect to said buoyant member, whereby when said transfer chamber is filled with a predetermined amount of liquid to be subsequently dispensed said stop means will prevent further downward travel of said transfer chamber and thereby control the volume of liquid received therein.

3. The apparatus of claim 2 wherein said stop means is adjustably positionable for selctively controlling the quantity of liquid to be discharged by said dispensing apparatus.

4. Apparatus for dispensing controlled amounts of liquid, said apparatus comprising a supply drum containing the liquid to be dispensed, a generally planar float plate floating on the surface of said liquid and sized for vertical travel within said supply drum as said liquid level fluctuates therein, said float plate having at least one opening therein, a transfer chamber having outer dimensions which are slightly smaller than said opening permitting said transfer chamber to be freely vertically movable with respect to said float plate, said transfer chamber having a chamber inlet disposed below the liquid level in said supply tank, said chamber inlet being equipped with a one-way valve permitting liquid flow into said transfer chamber only, said transfer chamber being further equipped with a liquid outlet discharge tube, means for directing compressed air into said transfer chamber for discharging the liquid contents thereof through said liquid outlet discharge tube, stop means provided along the exterior of said transfer chamber engageable with the upper surface of said float plate when said transfer chamber has filled with a predetermined quantity of liquid to be dispensed.

5. The apparatus of claim 4 wherein said stop means is adjustably positionable with respect to said transfer chamber for selectively controlling the quantity of liquid received therein during a single filling operation.

6. The apparatus of claim 4 wherein said transfer chamber comprises a generally cylindrical body closed at its upper and lower ends by top and bottom plates, respectively, a liquid outlet discharge pipe extending through said top plate having an inlet adjacent said bottom plate, said bottom plate being equipped with a chamber inlet and valve means which permits liquid flow through said chamber inlet into said transfer chamber only, and a gas inlet for directing a gas under pressure into said transfer chamber for evacuating the liquid contents thereof via said liquid outlet discharge pipe.

7. The apparatus of claim 6 wherein said stop means is a loose fit ring equipped with a set screw, said loose fit ring being sized to be loosely received along the outer cylindrical body of said transfer chamber and being larger than the opening in said float plate, said set screw being engageable with said cylindrical body to fix said loose fit ring at a selected location along said cylindrical body to selectively control the quantity of liquid which will be received with said transfer chamber during a single filling operation.

8. The method of dispensing a liquid which comprises the steps floating a transfer chamber on the surface of the liquid to be dispensed, filling said transfer chamber with predetermined volume of liquid through an inlet located adjacent the bottom of said transfer chamber, and discharging a compressed gas into said transfer chamber to evacuate the liquid contents of said transfer chamber through a liquid discharge outlet positioned therein.

9. The method of claim 8 wherein said chamber is floated on a float plate.

10. The method of claim 9 wherein said chamber is vertically adjusted to, and held at a selected position with respect to said float plate for selectively controlling the volume of liquid which will be received within said transfer chamber during a single filling operation.

References Cited

UNITED STATES PATENTS

| | | | |
|---|---|---|---|
| 665,285 | 1/1901 | Turner | 222—373 X |
| 1,126,130 | 1/1915 | Torchiani | 222—373 |
| 2,901,006 | 8/1959 | Andrews | 222—180 X |

ROBERT B. REEVES, *Primary Examiner.*

HADD S. LANE, *Assistant Examiner.*